F. J. STENGER.
BALL JOINT PISTON CONNECTING ROD.
APPLICATION FILED AUG. 30, 1919.
1,350,747.
Patented Aug. 24, 1920.
2 SHEETS—SHEET 2.
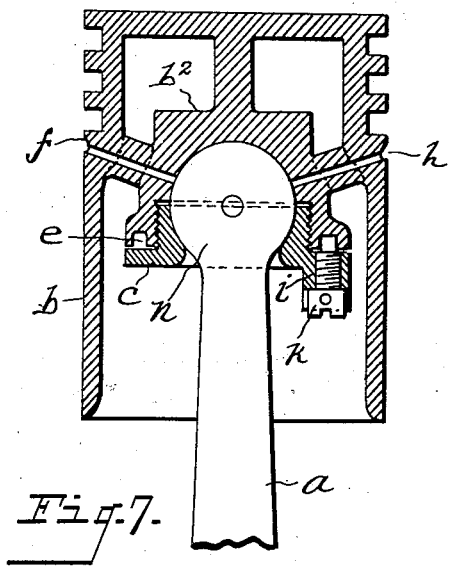
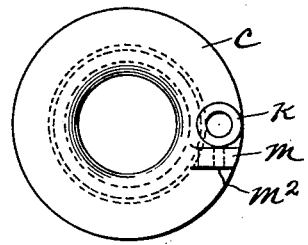
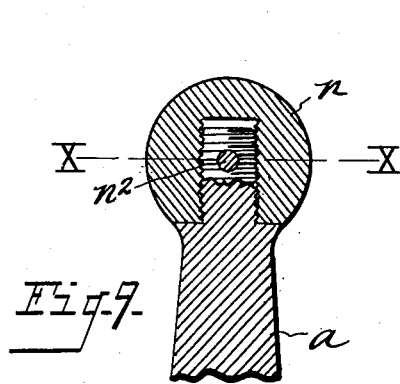
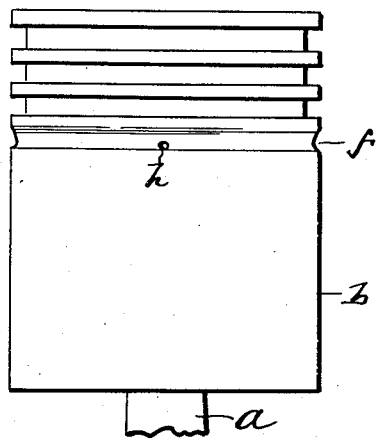
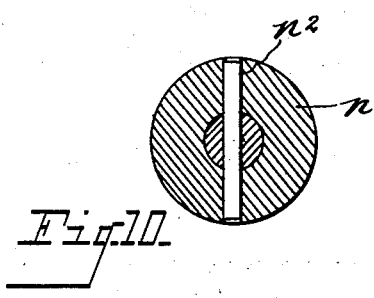
Inventor
FRANCIS J. STENGER.
By Ralzemond A. Parker
Attorney

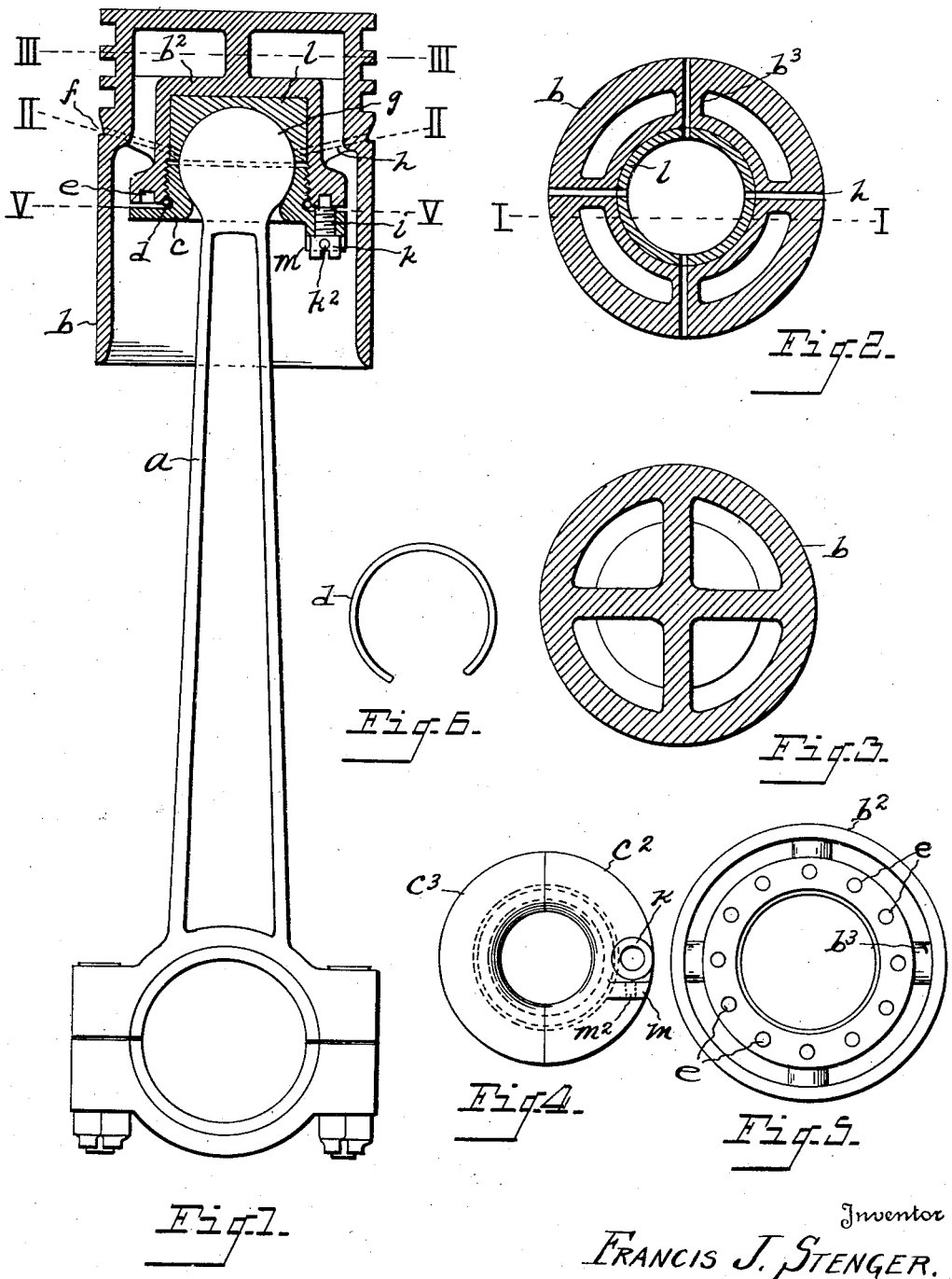

UNITED STATES PATENT OFFICE.

FRANCIS J. STENGER, OF DETROIT, MICHIGAN, ASSIGNOR OF ONE-HALF TO LEO JAMES GOYETTE, OF DETROIT, MICHIGAN.

BALL-JOINT PISTON-CONNECTING ROD.

1,350,747.  Specification of Letters Patent.  Patented Aug. 24, 1920.

Application filed August 30, 1919. Serial No. 320,819.

*To all whom it may concern:*

Be it known that I, FRANCIS J. STENGER, a citizen of the United States, residing at Detroit, county of Wayne, State of Michigan, have invented a certain new and useful Improvement in Ball-Joint Piston-Connecting Rods, and declare the following to be a full, clear, and exact description of the same, such as will enable others skilled in the art to which it pertains to make and use the same, reference being had to the accompanying drawings, which form a part of this specification.

This invention relates to piston connecting rods and their piston seating and method of connection with the piston, and consists in providing a ball joint which is carried in a bearing provided therefor in the piston as hereinafter set forth and described. The object of my invention is to provide a connecting rod joint with the piston which will insure a free flexible movement of the piston upon the rod and permit free accurate reciprocal action of the piston in the cylinder without side thrust or binding.

A further object is to provide a connection between the piston and connecting rod wherein a freely lubricated bearing will present a maximum of the bearing surface under each piston impulse.

A further object is to provide a connection that will do away with the present practice of using piston pins to hold a connecting rod to the piston with their attendant defects and disadvantages.

Under the present construction where piston pins are used, a constant wearing of the pin in its bushing seat tends to produce an elliptical bearing seat and piston pin knocking with its deteriorating action on the piston and cylinder is the result. If, as is frequently the case, there is longitudinal movement of the pin, the ends of the same scour the cylinder wall and the life of the cylinder is shortened thereby. It also frequently happens that the crank shaft of the engine is out of alinement with the cylinders and pistons and it becomes necessary to offset the connecting rods. This practice has become quite general in repair work. The result is that in the present construction where piston rings are employed there is a side thrust or bearing at one point upon the side of the piston surface against the cylinder wall with one piston impulse and a side thrust or bearing at another point with the return movement of the piston. This produces barrel-shaped pistons, gasolene leakage into the lubricating chamber, and a general unsatisfactory condition. The piston pin bearing presents moreover a comparaticely small bearing surface during each piston impulse while the ball joint herein described presents a distinctly larger wearing surface.

In the drawings:

Figure 1 is a sectional elevation taken on the line I—I of Fig. 2, showing a ball at the end of the connecting rod which is integral therewith mounted in a bushing seated in the piston.

Fig. 2 is a cross sectional view taken on line II—II of Fig. 1.

Fig. 3 is a cross sectional view taken on line III—III of Fig. 1.

Fig. 4 is a top plan view of the lock-nut which holds the ball seat.

Fig. 5 is a cross sectional view taken on line V—V of Fig. 1.

Fig. 6 shows the contraction ring used to hold the halves of the lock-nut together.

Fig. 7 is a sectional view of a modification showing a removable ball carried by the connecting rod.

Fig. 8 is a top plan view of the lock-nut formed in one piece.

Fig. 9 is a fragmentary sectional view of the connecting rod and removable ball carried thereby.

Fig. 10 is a cross section taken on line X—X of Fig. 9.

Fig. 11 is an exterior view of the piston.

Connecting rod $a$ is provided, as in Fig. 1, with a ball $g$ integral therewith which fits into a socket bearing $l$, such bearing being of such suitable material as may be desired and which is inset in a seat $b^2$ provided in a cored out piston $b$ and supported by web portions $b^3$. Through the web portions $b^3$ of such piston there are provided oil bypasses $h$ which bypasses are continued through the bearing and bearing seat so as to lubricate the ball and its bearing. These oil bypasses lead inwardly from a circumferential oil groove $f$ shown more clearly in Fig. 11.

The ball bearing seat is enlarged at the outer edge and circumferentially perforated as shown in Fig. 5 where a series of recessed openings $d$ are circumferentially arranged adapted to receive a dowel screw $k$ carried by lock-nut $c$.

This bearing seat is interiorly screw-threaded to receive a lock-nut $c$. In Fig. 1 where the ball is formed integral with the connecting rod this lock-nut is formed in halves $c^2$ and $c^3$ held together by a contraction ring $d$ and is provided with a boss $i$ threaded to receive dowel screw $k$ which is adapted to seat in recesses $q$ of the bearing seat. This holds the lock-nut in place. An upstanding tongue $m$ is provided on the boss $i$ slotted at $m^2$ to receive a cotter pin or wire which will be likewise received in slot $k^2$ of the dowel screw $k$ so as to hold said dowel screw in any desired position. It will be seen that lock-nut $c$ does not seat directly in the bearing $l$ and is adapted to permit adjustable insertion in $b^2$ and be locked in place by various adjustments. This will permit the wear on the ball and bearing to be taken up by the lock-nut, such adjustment to be made secure through the use of the dowel screw and cotter pin.

A modification is shown in Fig. 7 where a removable ball $n$ is carried at the end of the connecting rod $a$ and held in place by being screwed onto said connecting rod and made fast by a pin $n^2$. With this type of ball a two-part lock-nut, such as shown in Fig. 1, will be unnecessary. A cheaper form of piston may also be used and instead of providing a bronz bearing or bearing of other more expensive material, a seat for the ball will be provided directly in the piston which will be machined so the wear will be taken up on the ball and the ball itself can be replaced. A lock-nut and dowel screw arrangement as previously described, is here also provided.

What I claim is:

1. In a piston connecting rod ball joint and bearing, a ball carried by said rod, a hemispherical recessed seat in the piston to receive said ball, said seat adapted at its outer opening to receive a threaded lock-nut, the face of said seat provided with perforations circumferentially arranged, a lock-nut formed in halves overlapping said perforated face slotted and threaded to receive a dowel screw adapted to seat in any one of said perforations so as to maintain said lock-nut in its adjusted relationship with said ball seat, and means for locking said dowel screw.

2. In a connecting rod ball joint and bearing, a connecting rod provided with a ball, a piston provided with a recessed seat to receive said ball, said ball seat provided at its circumferential face with a series of recessed openings adapted to receive a dowel screw carried by a lock-nut, said recessed openings arranged in a circle on said circumferential face, said seat adapted to receive a lock-nut, a lock-nut formed in halves threaded to be inserted in the opening to said ball seat and formed interiorly to fit the curvature of said ball, a dowel-screw carried by said lock-nut adapted to be screwed inwardly and be received in one of said recessed openings, and means for holding said dowel screw in position.

3. In a connecting rod ball joint and bearing, a ball carried by said rod, a cored out piston containing a web supported seat, a bearing inset in said seat, said bearing adapted to receive the ball of said rod, said seat interiorly threaded to receive a lock-nut, the outer face of said seat provided with a series of recessed openings arranged circumferentially thereof and adapted to receive a dowel screw carried by a lock-nut, a lock-nut exteriorly threaded and interiorly formed to fit the curvature of the ball on said connecting rod and adapted to be screwed into said ball seat spaced slightly from the bearing and to overlap at its outer edge the perforated face of said bearing seat, a dowel screw carried in a boss on said lock-nut and adapted to be seated in one of said recessed openings, and means for locking said dowel in position.

4. In a connecting rod ball joint and bearing, a ball carried by said connecting rod, a cored out piston containing a web supported bearing seat, the bearing inset in said seat, an exterior circumferential oil groove on said piston, an oil bypass through the web portions of said piston, bearing, and bearing seat, providing communicating means between said oil groove and ball joint, said bearing seat interiorly threaded at the outer end to receive a lock-nut, a series of recessed openings circumferentially arranged on the face of said seat adapted to receive a dowel screw carried by said locknut, a lock-nut formed in halves held together by a contraction ring adapted to be received by said threaded portion of said seat, a boss on said lock-nut carrying a dowel screw, said dowel screw adapted to be received in one of said recessed openings, an upstanding projection on said boss slotted to correspond with slots in said dowel provided with a lock wire to lock said dowel in position.

5. In a connecting rod ball joint and bearing, a connecting rod carrying a ball, a cored out piston containing a web supported seat adapted to receive said ball, said seat adapted at its outer end to receive a lock-nut, the face of said seat provided with a series of recessed openings circumferentially arranged adapted to receive a dowel screw carried by said lock-nut, a lock-nut adapted to be received by said seat and overlapping the perforated face thereof, carrying a dowel screw, said dowel screw, means for locking said dowel screw in position and means for lubricating said ball joint.

6. In a connecting rod ball joint and bearing, a rod a ball carried by said rod, a piston containing a recessed seat adapted to receive said ball, said recessed seat likewise adapted at its outer opening to receive a lock-nut, the outer face of which seat is circumferentially perforated, a lock-nut interiorly formed to fit the curvature of said ball adapted to be received in said seat overlapping said perforated face, a boss on said overlapping portion, a dowel screw carried in said boss adapted to be received in said recessed perforations in the face of said seat, means for locking said dowel screw in position, oil bypasses through the web portions of said piston leading from a circumferential oil groove on the exterior of said piston to the ball joint.

In testimony whereof I sign this specification.

FRANCIS J. STENGER.